US011188856B2

(12) United States Patent
Oliveira Almeida et al.

(10) Patent No.: US 11,188,856 B2
(45) Date of Patent: Nov. 30, 2021

(54) ANALYSIS AND CORRECTION OF SUPPLY CHAIN DESIGN THROUGH MACHINE LEARNING

(71) Applicant: KINAXIS INC., Ottawa (CA)

(72) Inventors: Marcio Oliveira Almeida, Stittsville (CA); Zhen Lin, Kanata (CA); Behrouz Haji Soleimani, Halifax (CA); Seyednaser Nourashrafeddin, Ottawa (CA); Chantal Bisson-Krol, Kanata (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/060,225

(22) Filed: Oct. 1, 2020

(65) Prior Publication Data

US 2021/0089989 A1   Mar. 25, 2021

Related U.S. Application Data

(63) Continuation of application No. 16/147,311, filed on Sep. 28, 2018, now Pat. No. 10,832,196.

(60) Provisional application No. 62/725,345, filed on Aug. 31, 2018.

(51) Int. Cl.
  *G06Q 10/06* (2012.01)
  *G06N 20/00* (2019.01)
  *G06N 5/04* (2006.01)
  *G06F 16/28* (2019.01)

(52) U.S. Cl.
  CPC ....... *G06Q 10/06315* (2013.01); *G06N 5/048* (2013.01); *G06N 20/00* (2019.01); *G06F 16/285* (2019.01)

(58) Field of Classification Search
  CPC .. G06Q 10/06315; G06N 20/00; G06N 5/048; G06F 16/285
  See application file for complete search history.

(56) References Cited

U.S. PATENT DOCUMENTS

| 8,428,987 | B2 * | 4/2013 | Najmi | G06Q 30/0202 |
| | | | | 705/7.11 |
| 8,494,823 | B2 * | 7/2013 | Ding | G06Q 10/08 |
| | | | | 703/6 |
| 8,600,981 | B1 * | 12/2013 | Chau | G06F 16/9535 |
| | | | | 707/723 |
| 10,032,180 | B1 * | 7/2018 | Shariff | G06Q 30/02 |
| 2005/0171825 | A1 * | 8/2005 | Denton | G06Q 10/06 |
| | | | | 705/7.22 |
| 2010/0125486 | A1 * | 5/2010 | Sinclair | G06Q 10/08 |
| | | | | 705/7.31 |
| 2014/0122179 | A1 * | 5/2014 | Chan | G06Q 30/0202 |
| | | | | 705/7.31 |

(Continued)

*Primary Examiner* — Sujay Koneru
(74) *Attorney, Agent, or Firm* — Stratford Group Ltd.

(57) ABSTRACT

A method and system for a machine learning cluster analysis of historical lead time data, which is augmented by one or more features. The data can also be divided into groups, based on time-density of the data, with clustering performed on each group. Furthermore, clustering can also be projected onto two dimensions. In addition, the historical lead time data is separated into a plurality of tolerance zones based on tolerance criteria. The clusters are separated in accordance with a tolerance zone of each group; and further separated according to one or more lead time identifiers to provide one or more separated clusters.

12 Claims, 14 Drawing Sheets

(56) References Cited

U.S. PATENT DOCUMENTS

| | | | |
|---|---|---|---|
| 2014/0192050 A1* | 7/2014 | Qiu | G06K 9/00214 |
| | | | 345/420 |
| 2015/0066552 A1* | 3/2015 | Shami | G06Q 10/0631 |
| | | | 705/7.12 |
| 2016/0027026 A1* | 1/2016 | Matsui | G06Q 10/087 |
| | | | 705/7.31 |
| 2017/0017896 A1* | 1/2017 | Hamann | G06N 20/20 |
| 2017/0124495 A1* | 5/2017 | Saxena | G06Q 10/0637 |
| 2018/0101814 A1* | 4/2018 | Nadella | G06N 5/04 |
| 2018/0123909 A1* | 5/2018 | Venkitapathi | H04L 43/16 |
| 2018/0203915 A1* | 7/2018 | Marshall | G06F 16/355 |
| 2018/0322462 A1* | 11/2018 | Jayaraman | G06F 40/174 |
| 2019/0095842 A1* | 3/2019 | Brousseau | G06N 7/08 |
| 2019/0156298 A1* | 5/2019 | Ethington | G06N 20/20 |
| 2019/0171194 A1* | 6/2019 | Sato | G05B 19/41875 |
| 2019/0198136 A1* | 6/2019 | Hou | G06N 7/005 |
| 2019/0258978 A1* | 8/2019 | Mahajan | G06Q 10/04 |
| 2020/0074401 A1* | 3/2020 | Oliveira Almeida | G06N 5/003 |

\* cited by examiner

ANALYSIS AND CORRECTION OF SUPPLY CHAIN DESIGN THROUGH MACHINE LEARNING

PRIORITY CLAIM

This application is a continuation of U.S. Ser. No. 16/147,311, filed Sep. 28, 2018, which claims priority to U.S. Provisional Application No. 62/725,345, filed Aug. 31, 2018; both of which are hereby incorporated by reference in their entirety.

TECHNICAL FIELD

The present disclosure relates generally to supply chain management and more particularly to adjusting supply chain planning based on analysis of historical supply chain management performance.

BACKGROUND

In spite of technical advances, there is still a large gap between how a supply chain is designed and how it actually operates. A supply chain is a complex system, since it includes many interdependent components. A problem with a single component (e.g. a chronic late supplier)—or many—may result in repercussions throughout the supply chain, resulting in a loss of efficiency and revenue. Therefore, it is advantageous to accurately measure the actual capabilities of a supply chain, compare them with the original design, and make systematic corrections if necessary. In addition, it would be helpful to perform an in-depth analysis of the deviations from the original design, to identify root-causes of these discrepancies and thereby provide a long-term solution, thereby improving business metrics (e.g. revenue, customer satisfaction, overall inventory, etc).

A number of publications discuss predictive analysis of business metrics based on analysis of historical data (including machine learning).

U.S. Pub. No. 2008/0065436 A1 discloses methods, systems and computer program products for supporting supply chain facility performance analysis. The method comprises identification of variables related to the performance of supply chain facilities, and an analysis of the performance thereof using standard data envelope analysis, statistical analysis and sensitivity analysis. Performance rankings of the supply chain facilities are calculated, while a prescription for performance improvement is provided.

U.S. Pub. No. 2010/138264 A1 discloses a dynamic business enhancement system that provides a company access to its historic, current and future operational states. A dynamic data engine is used to create and display historic transactions, current stock levels and forecasted demand data in real-time. Attributes of original transactional data are configured and modified dynamically—which result in managed demand forecast, budget and purchasing information. Any change in the raw data due to a business transaction is immediately reflected in the demand forecast.

U.S. Pub. No. 2018/0101814 A1 discloses dynamic supply chain management systems and methods that can compile and decompose historical order data to identify causality factors that produced variability in historical order lead times or fill rates. These factors are applied to current orders to determine current order lead times and order fill rates.

U.S. Pat. No. 9,600,779 B2 discloses a machine learning classifier that includes a data set processing subsystem to generate a training set and a validation set from multiple data sources. The system further includes classifier hardware; a buffer connected to the classifier hardware; and a register connected to the classifier hardware. The classifier hardware induces a classifier according to the training set, and tests the classifier according to the validation set.

U.S. Pat. No. 6,611,726 B1 discloses a method for determining optimal time series forecasting parameters. The method includes choosing a dependent variable for which a value is to be forecast, gathering historical data on values of the dependent variable and associated variables in historical time periods, and determining a forecasting equation based on the historical data. The method further calculates a forecasted value of the dependent variable for a future time frame. It also calculates an error value by comparing the forecasted value with the historical data. The error value is then used to modify the forecasting equation to reduce the error value. As an example, the dependent variable may be product demand.

Berlec, T. et al disclose in their paper "Predicting Order Lead Times" (*J. of Mech. Eng.*, 54 (2008)5, 308-321), a procedure in which expected lead times of a company's planned orders are predicted based on the actual lead times of orders processed in the past. The procedure provides an empirical distribution of possible lead times for the new order, which is then used to predict the most probable lead time of a new order.

Lingitz, L. et al disclose in their paper "Lead time prediction using machine learning algorithms: a case study by a semiconductor manufacturer" (*Science Direct*, Procedia CIRP 72 (2018), 1051-1056), study of lead time prediction methods for semiconductor manufacturing. Supervised machine learning approaches are used for lead time prediction, based on historical production data obtained from manufacturing execution systems. Regression algorithms are examined for their effect on increasing accuracy of lead time prediction.

Lead time is an important supply chain metric which has a significant impact on inventory cost and late revenue in supply chains. Inaccurate lead time planning parameters can lead to significant supply chain inefficiency and cost overruns. Due to the large amounts and variability of data related to lead times, it is a challenge to detect and correct deviations in lead times used in the supply planning data, by conventional supply management tools. Nonetheless, such an analysis is important in order to enhance performance and efficiency of supply chain management.

SUMMARY

In accordance with an embodiment, a dynamic supply chain planning system comprising:

a database comprising historical lead time data related to a supply chain; a machine learning server in communication with the database, the machine learning server comprising a machine learning service and a data preparation module, wherein: the machine learning server is in communication with the database; the data preparation module is in communication with the database to obtain the historical lead time data; the data preparation module processes the historical lead time data into a processed historical lead time dataset for use by the machine learning service; the machine learning service comprises at least one of a forecasting module and a clustering module; the forecasting module is configured to forecast future lead times of the supply chain based on the processed historical lead time data set; the clustering module is configured to provide a plurality of clusters based on pre-defined features; and the machine learning server uploads the future lead times and the plurality of clusters to the database.

In some embodiments, the forecasting module divides the processed historical lead time data into a first portion of data points and a second portion of data points, the first portion consisting of more than 50% of the data points, the second portion consisting of less than 50% of the data points; trains each of a plurality of machine learning forecasting algorithms on the first portion and subsequently tests each of the plurality of machine learning forecasting algorithms on the second portion; selects that forecasting machine learning algorithm which has a greatest accuracy in testing the second portion; and retrains the selected forecasting machine learning algorithm on the processed historical lead time data.

In some embodiments, the first portion consists of 51%-80% of the data points, and the second portion consists of 20%-49% of the data points, such that the first and second portion total 100% of the data points.

In some embodiments, the plurality of machine learning algorithms comprise Adaboost Regressor, FB Prophet, linear regression, mean and median.

In some embodiments, the historical lead time data is over a period of two years.

In some embodiments, the forecasting module provides monthly future lead time data based on a monthly average of daily future lead time data.

In some embodiments, the clustering module separates the processed historical lead time data into groups based on a density of data points and linearity of historical lead times; performs a cluster analysis based on each of the pre-defined features within each group, with the pre-defined features selected from seasonality and linearity; prunes each cluster; and divide each cluster into a plurality of subclusters.

In some embodiments, the system further comprises: an analytics module in communication with the database; and a user interface in communication with the analytics module; wherein the analytics module is configured to: receive from a user via the user interface, tolerance criteria for separation of the historical lead time data into a plurality of tolerance zones based on median absolute differences between actual lead time data and historical planned lead time data; and separate the historical lead time data into the plurality of tolerance zones. In relation to the forecasting module, the analytics module is configured to: obtain future lead times forecast by the forecasting module from the database; replace future planned lead times by the future lead times forecast by the forecasting module in accordance with an action criterion defined by the user for each tolerance zone. Furthermore, in relation to the clustering module, the analytics module is configured to: obtain the plurality of clusters from the database; separate the plurality of clusters in accordance with the tolerance zone of each group; further separate the plurality of clusters according to lead time identifiers; and identify within the separated clusters, clusters that have the largest median absolute differences between actual lead times and planned lead times.

In some embodiments, the analytics module forms part of a rapid response planning system that, prior to any up-to-date change in the historical lead time data: processes the tolerance zones;

replaces future planned lead times by the future lead times forecast by the forecasting module in accordance with the action criterion; and identifies the clusters that have the largest median absolute differences between actual lead times and planned lead times.

In accordance with another embodiment, a dynamic supply chain planning system comprising:

a processor operable to execute instructions stored in a memory; and the memory includes specific instructions for forecasting future lead times of the supply chain based on historical lead time data; wherein execution of the specific instructions causes the processor to: receive the historical lead time data from a database; process the historical lead time data by removing outlier data; divide the processed historical lead time data into a first portion of data points and a second portion of data points, the first portion consisting of more than 50% of the data points, the second portion consisting of less than 50% of the data points;

train each of a plurality of machine learning forecasting algorithms on the first portion and subsequently test each of the plurality of machine learning forecasting algorithms on the second portion; select that forecasting machine learning algorithm which has a greatest accuracy in testing the second portion; retrain the selected forecasting machine learning algorithm on the processed historical lead time data; use the selected forecasting machine learning algorithm to forecast future lead times of the supply chain; and upload the future lead times to the database.

In some embodiments of the system, the first portion consists of 51%-80% of the data points, and the second portion consists of 20%-49% of the data points, such that the first and second portion total 100% of the data points; and the plurality of machine learning algorithms comprise Adaboost Regressor, FB Prophet, linear regression, mean and median.

In some embodiments of the system, the historical lead time data is over a period of two years; and the future lead times are based on a monthly average of daily future lead time data.

In some embodiments of the system, the specific instructions further allow for: separation of the historical lead time into groups; and processing of the future lead times; wherein execution of the specific instructions causes the processor to: receive from a user, tolerance criteria for separation of the historical lead time data into a plurality of tolerance zones based on median absolute differences between actual lead time data and historical planned lead time data; prior to any up-to-date change in the historical lead time data, separate the historical lead time data into the plurality of tolerance zones; and prior to any up-to-date change in the historical lead time data, replace future planned lead times by the future lead times in accordance with an action criterion defined by the user for each tolerance zone In accordance with another embodiment, a dynamic supply chain planning system comprising:

a processor operable to execute instructions stored in a memory; and the memory that includes specific instructions for grouping historical lead time data of a supply chain into a plurality of clusters; wherein execution of the specific instructions causes the processor to:

receive the historical lead time data from a database; process the historical lead time data by removing outlier data; separate the processed historical lead time data into groups based on a density of data points and linearity of historical lead times; perform a cluster analysis based on each of the pre-defined features within each group, with the pre-defined features selected from seasonality and linearity; prune each cluster; divide each cluster into a plurality of subclusters; and upload the clusters to the database.

In some embodiments of the system, the specific instructions further allow for: separation of the historical lead time into groups; and processing of the clusters; wherein execution of the specific instructions causes the processor to: receive from a user, tolerance criteria for separation of the historical lead time data into a plurality of tolerance zones based on median absolute differences between actual lead time data and historical planned lead time data; and prior to any up-to-date change in the historical lead time data: separate the historical lead time data into the plurality of tolerance zones; obtain the plurality of clusters from the database; separate the plurality of clusters in accordance with the tolerance zone of each group; further separate the plurality of clusters according to lead time identifiers; and identify within the separated clusters, clusters that have the largest median absolute differences between actual lead times and planned lead times.

In accordance with another embodiment, a computer-implemented method comprising:

receiving historical lead time data from a database of dynamic supply chain planning system;

processing the historical lead time data by removing outlier data; accessing at least one of a machine learning forecasting module and a machine learning clustering module. When accessing the machine learning forecasting module, the method comprises: dividing the processed historical lead time data into a first portion of data points and a second portion of data points, the first portion consisting of more than 50% of the data points, the second portion consisting of less than 50% of the data points; training each of a plurality of machine learning forecasting algorithms on the first portion and subsequently test each of the plurality of machine learning forecasting algorithms on the second portion; selecting that forecasting machine learning algorithm which has a greatest accuracy in testing the second portion; retraining the selected forecasting machine learning algorithm on the processed historical lead time data; using the selected forecasting machine learning algorithm to forecast future lead times of the supply chain; and uploading the future lead times to the database. When accessing the machine learning clustering module, the method comprises: separating the processed historical lead time data into groups based on a density of data points and linearity of historical lead times; performing a cluster analysis based on each of the pre-defined features within each group, with the pre-defined features selected from seasonality and linearity; pruning each cluster; dividing each cluster into a plurality of subclusters; and uploading the clusters to the database.

In some embodiments of the method, the dynamic supply chain planning system is a rapid response planning system, and the method further comprises: receiving from a user via a user interface, tolerance criteria for separation of the historical lead time data into a plurality of tolerance zones based on median absolute differences between actual lead time data and historical planned lead time data; prior to any up-to-date change in the historical lead time data, separating the historical lead time data into the plurality of tolerance zones; and prior to any up-to-date change in the historical lead time data, replacing future planned lead times by the future lead times in accordance with an action criterion defined by the user for each tolerance zone.

In some embodiments of the method, the dynamic supply chain planning system is a rapid response planning system, and the method further comprises: receiving from a user via a user interface, tolerance criteria for separation of the historical lead time data into a plurality of tolerance zones based on median absolute differences between actual lead time data and historical planned lead time data; prior to any up-to-date change in the historical lead time data:

separating the historical lead time data into the plurality of tolerance zones; separating the plurality of clusters in accordance with the tolerance zone of each group; further separating the plurality of clusters according to lead time identifiers; and identifying within the separated clusters, clusters that have the largest median absolute differences between actual lead times and planned lead times.

In some embodiments of the method, the first portion consists of 51%-80% of the data points, and the second portion consists of 20%-49% of the data points, such that the first and second portion total 100% of the data points; and the plurality of machine learning algorithms comprise Adaboost Regressor, FB Prophet, linear regression, mean and median.

The term "rapid response" is defined further below.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF DRAWINGS

Embodiments may be more completely understood in consideration of the following detailed description of various embodiments in connection with the accompanying drawings, in which.

DETAILED DESCRIPTION

A supply chain can be defined as a sequence of processes and/or events in the production and distribution of a product. A supply chain can include information about equipment, raw materials, parts, components, organizations, people, locations, modes of transport and resources used to produce a product and move the product from a manufacturer or supplier to a customer. Many factors can influence the supply chain at a variety of different points in the chain, and these factors are often unpredictable.

One metric that provides insight into the behaviour of a supply chain is lead time. Other metrics in the supply chain can also provide insight. One definition of lead time is the time between the start and the completion of production process. For example, if it takes five days to ship a bicycle from Montreal to Vancouver once an order is received, the lead time of the bicycle shipment from Montreal to Vancouver is 5 days.

Figure 1:
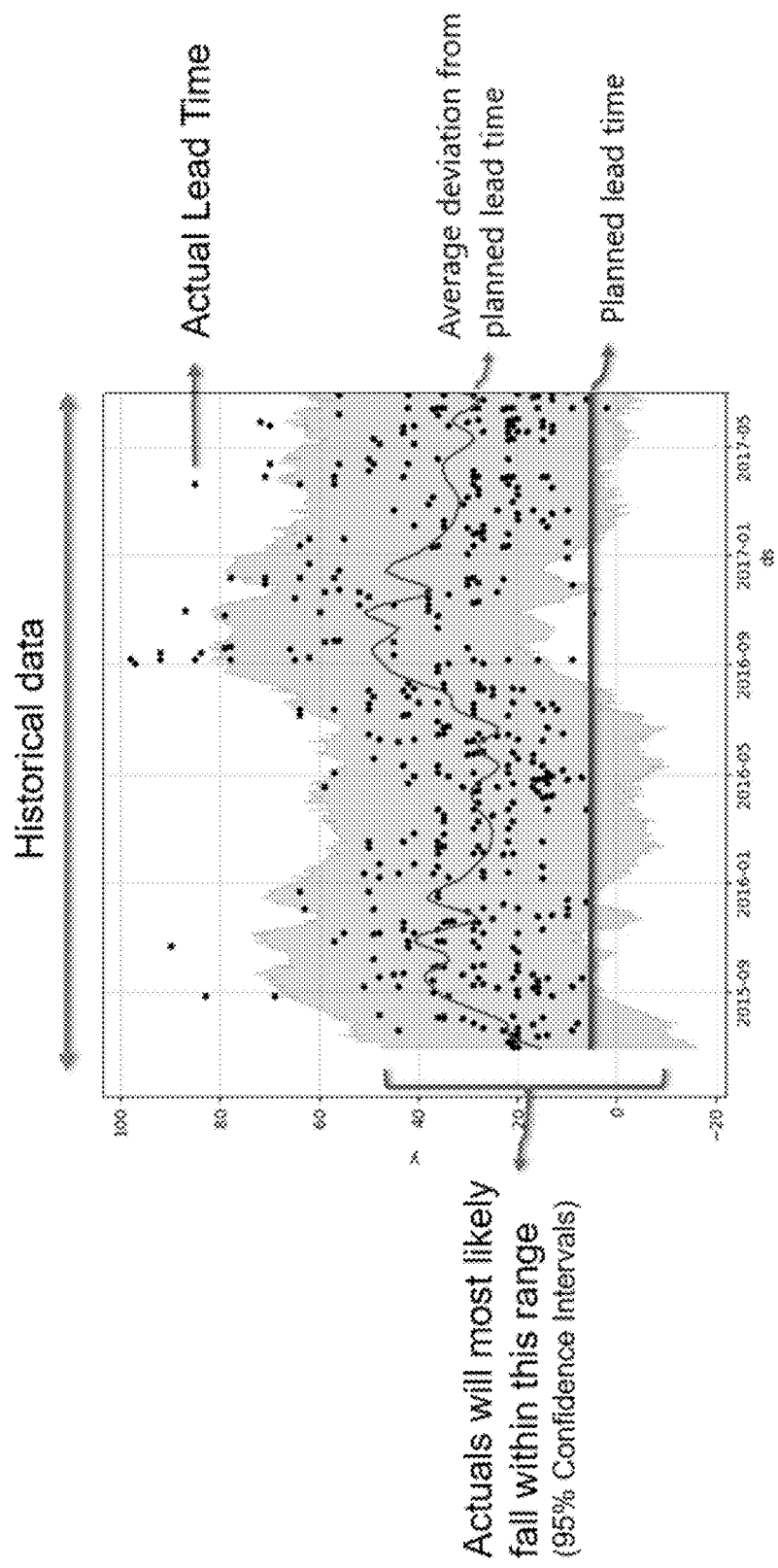
FIG. 1 illustrates planned lead time vs. actual lead time over a 2-year period.

A supply chain can have hundreds of thousands—if not millions—of lead time data points over a period of time. In supply chain management, lead times are often designed (or planned). The actual lead time data are often different from the planned lead times, as shown in FIG. 1 in which the planned and actual lead times (in units of days) are shown for a period of 2 years (from July 2015 to July 2017). The solid line indicates that the planned lead time in the design of the supply chain was 5 days. However, the actual lead time data (indicated by the data points) rarely matched the planned lead time. The average deviation (between the planned and actual lead times) is shown as well and varies between 15 days (minimum) to 50 days (maximum), with the average being around 30 days.

This analysis shows the clear discrepancy between how the supply chain was designed to operate (between July 2015-July 2017) and how it actually operated during that time. Serious consequences can arise between such large discrepancies. For example, if a 5-day lead time is used to estimate when to purchase or manufacture new supplies—when in actuality, the lead time is 30 days—then there will be a chronic shortage of materials downstream the chain. The supply shortages invariably lead to additional costs to expedite supplies, and also lead to later deliveries to customers, thereby increasing costs and reducing revenue.

In an embodiment, the historical lead time data is analyzed using machine learning algorithms that can forecast lead times and provide a cluster analysis of the historical lead time data to ascertain factors that are contributing towards deviations.

In the present disclosure embodiments are provided to identify, categorize, and visualize variability in historical lead times. In addition, machine learning algorithms can be used to predict lead times, and if necessary, adjust planned lead times. Furthermore, parts with similar patterns of lead time deviation may be clustered into the same group with the use of machine learning algorithms. The clustering can help a planner to visually identify similar problems in lead times of purchase orders. As such, the deviations of lead times for future purchase orders can be adjusted automatically or based on manual review. Furthermore, business metrics before and after adjusting lead times may be projected in order to compare the impact of accepting the lead time recommendations provided by the machine learning algorithm.

Figure 2A:
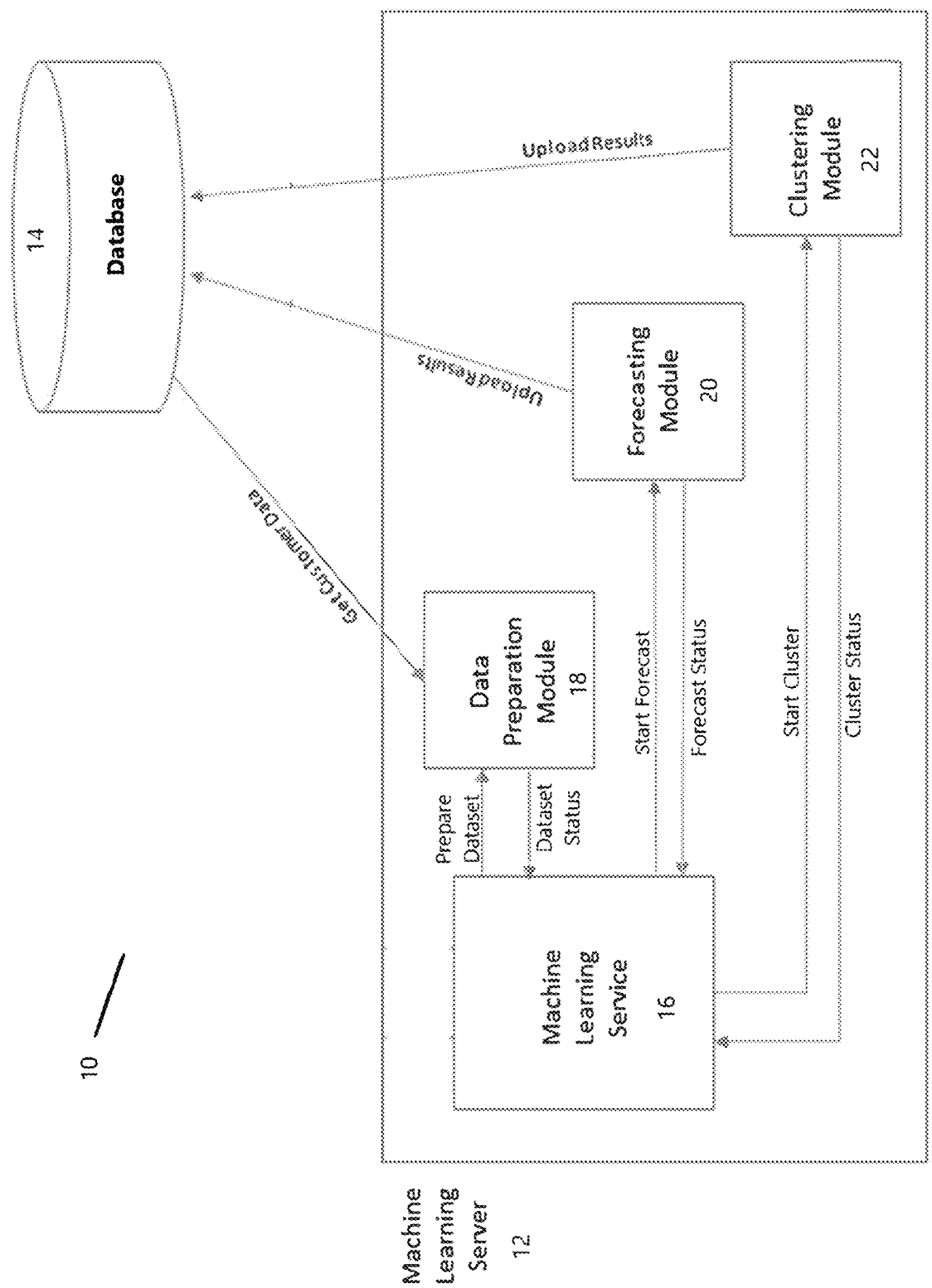
FIG. 2A illustrates system architecture of an embodiment of application of machine learning for analysis and correction of supply chain design.

FIG. 2A illustrates system architecture (10) of an embodiment of application of machine learning for analysis and correction of supply chain design. A machine learning server (12) is in communication with a database (14) that contains data related to supply chain planning, including historical lead times. The machine learning server comprises a machine learning service (16) that comprises a data preparation module (18), a forecasting module (20) and a clustering module (22), each of which are in communication with the database (14). The machine learning service (16) first initiates preparation of the dataset prior to analysis by the forecasting and clustering modules (20, 22). As such, the data preparation module (18) obtains data from the database (14), and then performs data preparation (described below) on the dataset. The dataset status is communicated to the machine learning service (16).

Once the dataset status is complete, the machine learning service (16) initiates a forecasting analysis (based on the prepared dataset) via the forecasting module (20), which then communicates the forecast status to the machine learning service (16). Once the forecast status is complete, the forecasting module (20) uploads the forecast results to the database (14).

Once the dataset status is complete, the machine learning service (16) also initiates a clustering analysis (based on the prepared dataset) via the clustering module (22), which then communicates the cluster status to the machine learning service (16). Once the cluster status is complete, the clustering module (22) uploads the cluster results to the database (14).

The forecasting analysis and clustering analysis may be performed in parallel. They may also be performed sequentially, with either clustering or forecasting analysis performed first.

The forecast results and clustering results, once uploaded to the database (14), may be used for further analysis and planning by a supply chain planning platform.

The database (14) may be incorporated into a separate supply chain planning platform server; or may be stand-alone in a separate server; or may be incorporated into the machine learning server (12).

Figure 2B:
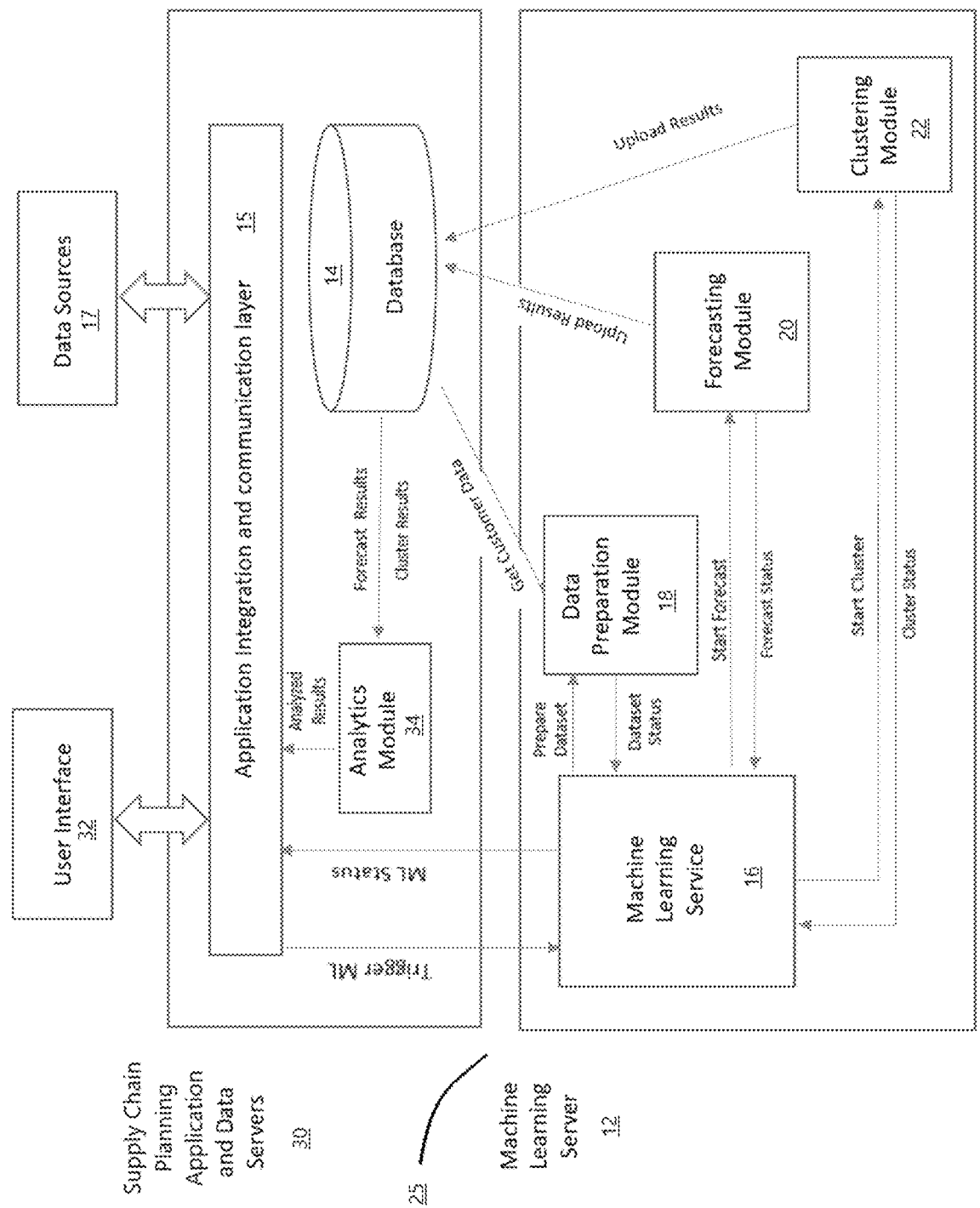
FIG. 2B illustrates system architecture of the embodiment shown in FIG. 2A integrated with a supply chain planning platform.

FIG. 2B illustrates a system architecture 25 of an embodiment which may be implemented as software (e.g., machine-executable instructions) stored on a non-transitory computer readable medium and executed by one or more processors. The architecture 25 may represent a software architecture that is implemented on computing hardware. As an example, FIG. 2B illustrates system architecture of the embodiment shown in FIG. 2A, integrated with a supply chain planning platform. The numerical references for components common between FIGS. 2A and 2B are identical.

A machine learning server (12) is integrated with a supply chain planning platform that comprises a supply chain planning application and data servers (30). The Machine learning service (16) may be triggered via a user interface (32) that is part of the supply chain planning platform. Once triggered, the machine learning service operates with the data preparation module (18), forecasting module (20) and clustering module (22), as described above (with reference to FIG. 2A). The forecasting results and clustering results are uploaded onto the database (14); then communicated to an analytics module (34), which then communicates the analyzed results to a user via the user interface (32).

The architecture 25 includes an application service integration and communication layer 15 that supports data collection from the data sources 17, and optionally other systems and applications (not shown). The layer 15 may also provide secure access with a user interface 32, which may allow users to log into the supply chain planning platform 30 to view data or perform other operations. The layer 15 may utilize a full featured web services library to provide a connection for the user interface 15 to the platform 30. Generally, the layer 15 provides a mechanism for interfacing with the different systems and web interfaces. The layer 15 may include APIs to communicate with the data sources 17 and other systems and applications (not shown). For example, the layer 15 receives data from the data sources 17.

An example of a supply chain planning platform that may be integrated with the machine learning server (12) is one that provides rapid processing of business metrics and scenario simulations. That is, processing of the historical lead time data, and processing of the machine learning results (i.e. forecasting future lead times, clustering of historical lead times) is performed such that machine learning results are up-to-date (i.e. there is no further changes in the historical lead time data while results involving hundreds of thousands, even millions of data points, are being processed). An example of a supply chain planning platform that provides rapid processing of business metrics and scenario simulations is disclosed in U.S. Pat. Nos. 7,610,212 B2; 8,015,044 B2; 9,292,573 B2; and U.S. Pub. No. 20130080200A1—all of which are incorporated herein by reference. Such a "rapid" platform is heretofore referred to as a "rapid response" supply chain planning platform.

System 25 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure. In embodiments, the system or components thereof can comprise or include various modules, each of which is constructed, programmed, configured, or otherwise adapted to autonomously carry out a function or set of functions.

Figure 3:
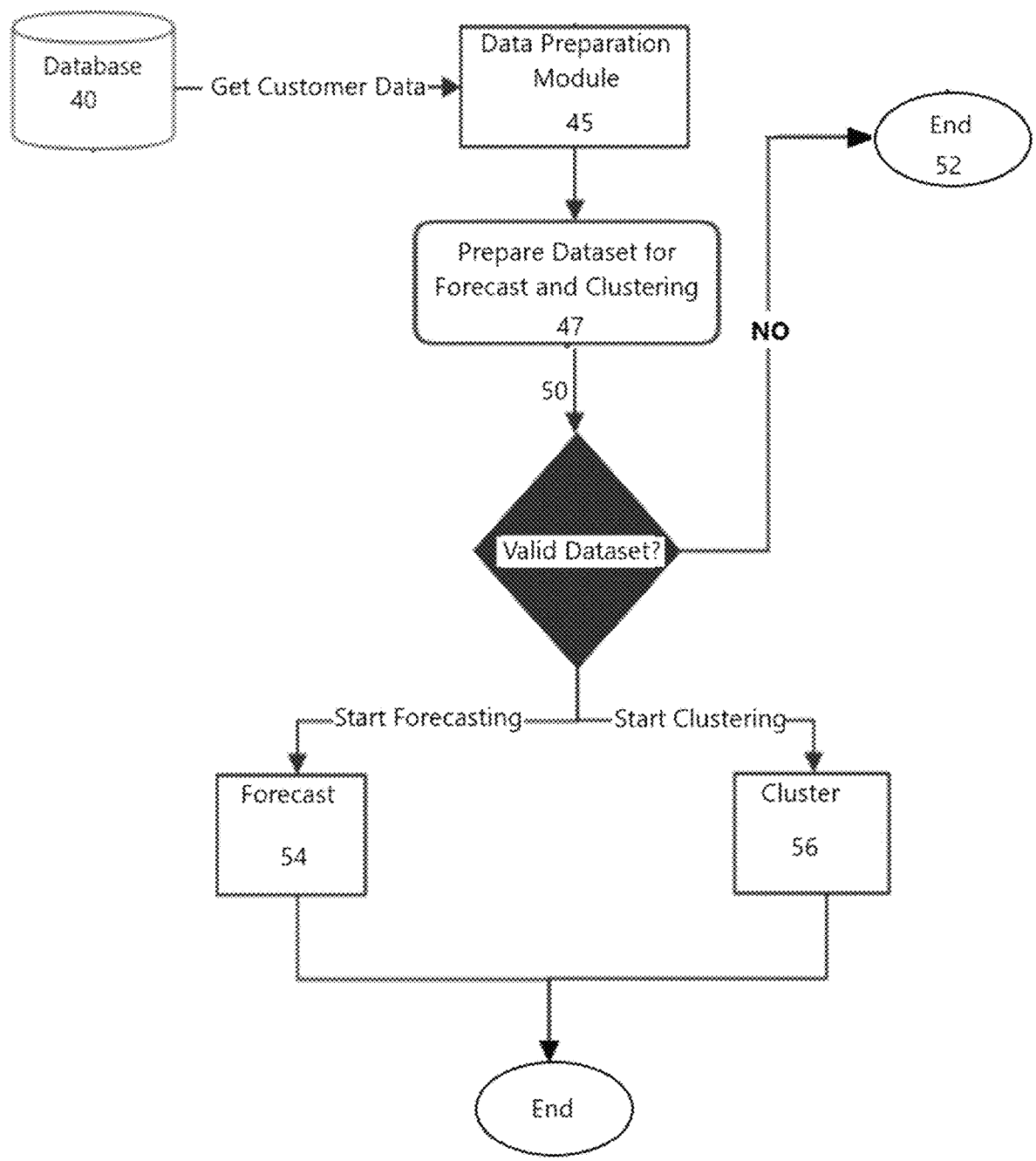
FIG. 3 illustrates a flow chart of an embodiment of applying machine learning to supply chain data.

FIG. 3 illustrates a flow chart of an embodiment of applying machine learning to supply chain planning data. A supply chain planning database (40) may include historical data for a supply chain management system of a customer over a period of time. This can include supply chain planning data related to historical actual orders placed against suppliers on a given date (such as information about a lead times, order dates, quantities, unit prices, the source that provided the part, etc.), information about a unique part and site (such as the part name, description, price and cost data, etc.), and information pertaining to contact people at suppliers (such as information about the contact person for the source, the supplier ID, the source ID, the transportation mode, etc.).

The raw data is then prepared for machine learning (47) via a data preparation module (45). Prior to sending the prepared dataset for use by machine learning algorithms, the prepared dataset can proceed through a final check (50) to make sure that there is a valid dataset for the machine learning application. For example, in the process of preparing the dataset for machine learning, it may be that the prepared dataset does not contain enough points for analysis—at which point the process ends (52). Where the prepared dataset is valid, two machine learning algorithms may be applied in parallel to forecast (54) important supply chain attributes such as lead times, and perform a cluster analysis (56) on the historical data to determine similar patterns/characteristics. The two applications of machine learning may be performed in parallel, or sequentially. In addition, while two types of machine learning applications (i.e. forecasting and clustering) are illustrated, fewer (i.e. one) or more machine learning applications may be performed.

Figure 4:
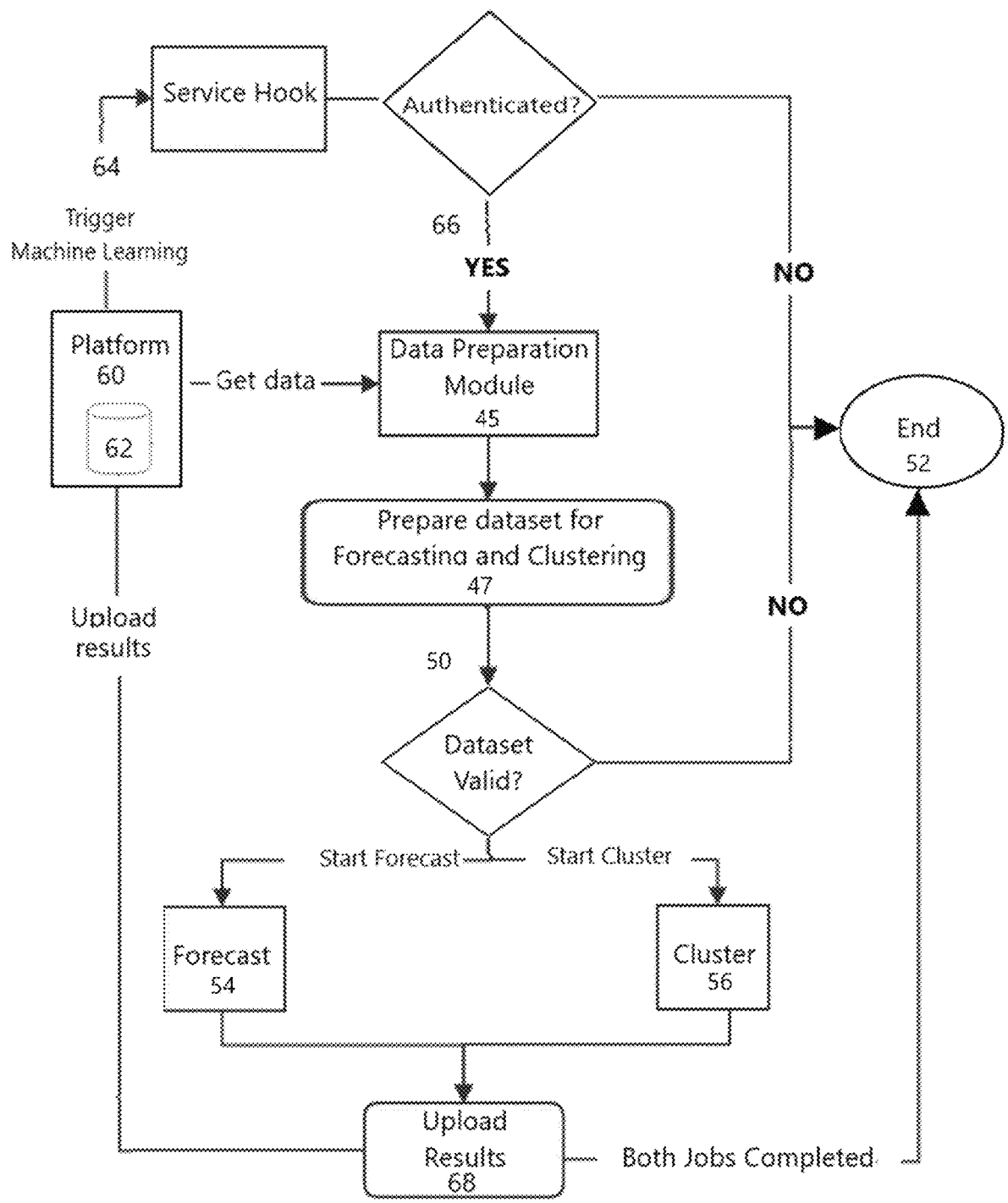
FIG. 4 illustrates a flow chart of an integration of the embodiment shown in FIG. 3 with a supply chain planning platform.

The process shown in FIG. 3 may form a component of a larger supply chain planning platform, as shown in FIG. 4 which illustrates a flow chart of an integration of the embodiment shown in FIG. 3 with a supply chain planning platform (60). Here, a supply chain planning platform (60) can include data (62) related to the design of a customer's supply chain, as well as means/schedules for updating the data. For example, a customer may request analysis and update of an existing design via machine learning on a monthly or quarterly basis (or some other regular period). The scheduling can trigger (64) the machine learning process, which initiates the machine learning service prior to authentication of customer information. Once customer information is authenticated (66), the process illustrated in FIG. 3 goes into effect, with the machine learning results (68) returned to the supply chain planning platform (60) for further application and analysis.

Preparation of Data for Machine Learning

Figure 5:
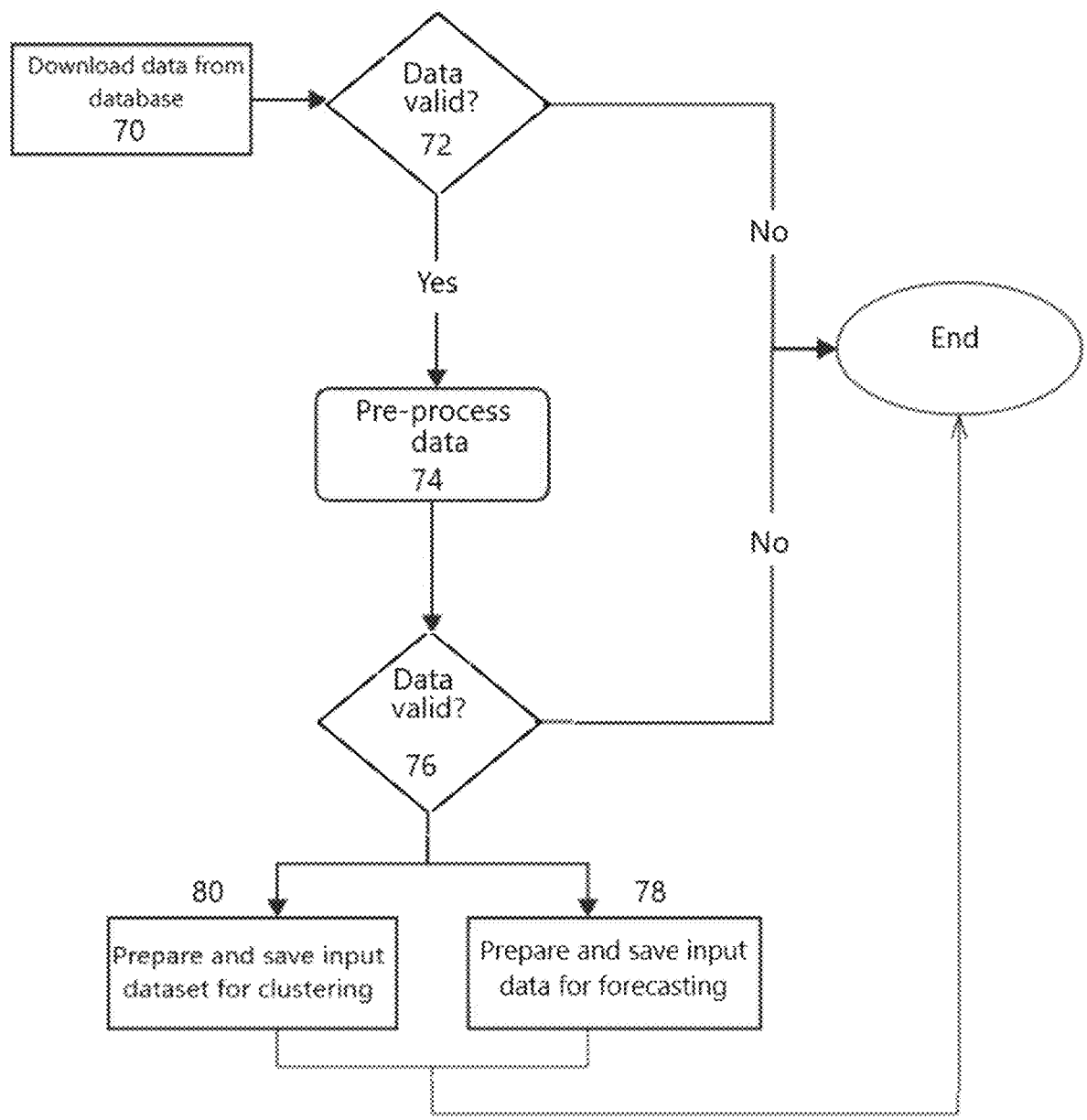
FIG. 5 illustrates a flow chart of a data preparation module in FIGS. 3 and 4.

FIG. 5 illustrates a flow chart of a data preparation module in FIGS. 3 and 4. When the historical data is downloaded (70) from the database, it is first checked (72) to make sure there is valid data. It can then be pre-processed (74) (e.g. cleaned up, as described below), and then checked once again (76) to make sure there is a valid dataset for machine learning. If the processed dataset is valid, it may then be formatted into a format appropriate for forecasting and clustering, respectively (78, 80).

In some embodiments, lead time data is obtained from the historical supply actual data in the customer's enterprise data source(s). The historical lead time data can be data over a period of time. To enhance accuracy Forecast and Cluster results, a minimum of 2 years (24 months) worth of historical data can be used. As an example (as shown in FIG. 1), a 2-year time period may be used—although other time periods may be used (for example 1-year, 15 months, 18 months, 21 months, 27 months, 30 months, 33 months, 36 months, or longer).

Before analysis by machine learning, the data may be "cleansed" to remove data errors and outliers. Examples of data errors may include records with null values, duplicate records, negative lead times, etc.

As for outliers, an outlier is a data point with a lead time that can lie outside an overall pattern of a time series. As an example of identification of outliers, the interquartile range (IQR) may be used (other statistical methods may also be used to calculate outliers). In the IQR method, a data point is an outlier if it is, for example, more than 1.5 times the IQR above the third quartile (Q3); or if it is, for example, less than 1.5 times the IQR in the first quartile (Q1). This can be expressed mathematically: a data point (DP) is an outlier if:

$DP<Q1-1.5*IQR$ or $DP>Q3+1.5*Q3$

The IQR method, as defined above, includes the following steps:
1. Calculates the median, the quartiles, and the IQR.
2. Calculates 1.5*IQR below the first quartile to check for low outliers.
3. Calculates 1.5*IQR above the third quartile to check for high outliers.

The calculations result in an upper and lower bound. Any records with lead times that are below the lower bound and above the upper bound are removed from the data set prior to input to the machine learning algorithms.

Example of Calculating Outliers

For example, assume the following historical actual lead times in the data:

| January | February | March | April | May | June | July |
|---------|----------|-------|-------|-----|------|------|
| 5       | 11       | 12    | 12    | 12  | 13   | 25   |

1. Calculating the median, the quartiles, and the IQR:
a. The median is 12
b. The quartiles are calculated by dividing the ordered data set into two halves. For an odd number of data points in the full data set, the median is included in both halves. The lower quartile value is the median of the lower half of the data. The upper quartile value is the median of the upper half of the data.
c. First quartile (also known as the 25th percentile or Q1)=11.5 (this is obtained by calculating the median of the numbers 5, 11, 12, 12).
d. Second quartile (also known as the 50th percentile or Q2)=12=Median
e. Third quartile (also known as the 75th percentile or Q3)=12.5 (this is obtained by calculating the median of the numbers 12, 12, 13, 25).
f. IQR=Q3−Q1=12.5−11.5=1
2. Calculating 1.5*IQR below the first quartile to check for low outliers:

$Q1-1.5 \times IQR = 11.5-(1.5)(1)=1$

Thus, a data point is considered a low outlier if less than 10. In this case, 5 is considered a low outlier.
3. Calculating 1.5*IQR above the third quartile to check for high outliers:

$Q3+1.5 \times IQR = 12.5+(1.5)(1)=14$

Thus, a data point is considered a high outlier if greater than 14. In this case, 25 is considered a high outlier.

Based on the IQR calculations above, there are two outliers (5 and 25) in the example data set.

Therefore, those two data points are removed prior to input into the machine learning algorithm.

Finally, the processed data set is prepared in a format that can be used by the Forecasting and Cluster algorithms.

Forecasting

Once the data is processed, it is ready to be used by a machine learning algorithm to forecast future lead times based on the actual historical lead time data.

Figure 6:
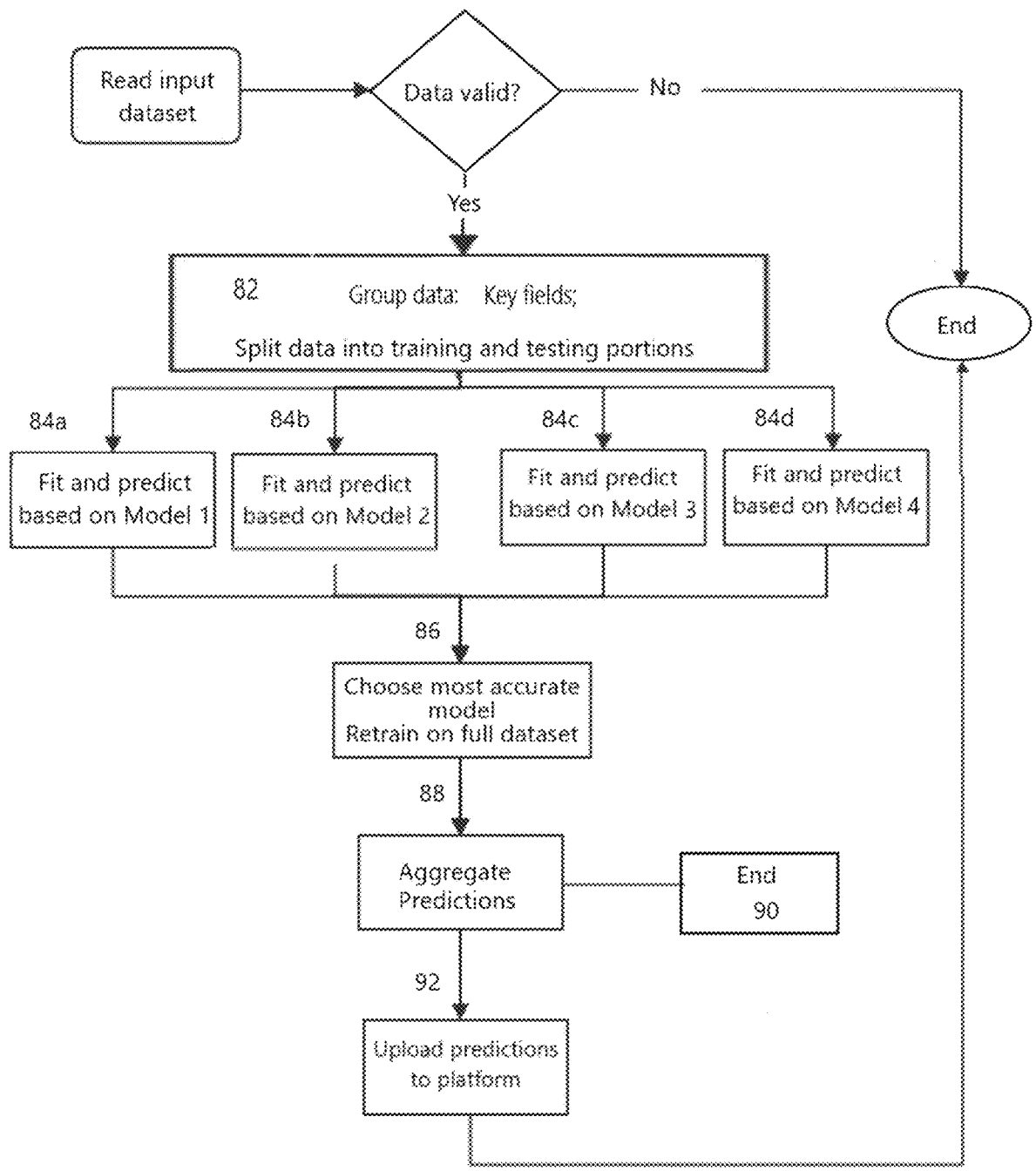
FIG. 6 illustrates a flow chart of the Forecasting component of FIG. 3.

FIG. 6 illustrates a flow chart of the Forecasting component of FIG. 3. Once the data is processed by the data preparation module, it is ready for the forecasting machine learning process. First the data can be grouped by key fields (82) (for example, a customer ID, a parts ID, etc). The data is also grouped into a first portion (called a training portion) and second portion (called a testing portion). Then, a plurality of forecasting machine learning algorithms are each trained on the training portion; the forecasting of each is tested on the testing portion. In FIG. 6, four algorithms (84a, 84b, 84c, 84d) are trained and tested. However, fewer or more algorithms may be used for training and testing. The most accurate model (86) is then selected and retrained on the full historical dataset. It is then used to predict (or forecast) (88) lead times for a future period (for example, 3-6 months; 6-12 months; 1-2 years, etc). The process can then end (90). Alternatively, if the machine learning process is part of a supply chain planning platform (as in FIG. 4), the results are uploaded (92) to the platform for further analysis/use.

Aspects of FIG. 6 are described in further detail below.

The forecast machine learning algorithm can predict the lead time of purchased items (or parts) from different suppliers at different times of the year. Each item may exhibit a different behavior in terms of lead time due to many factors including: its varying demand over the year, the geographical location of suppliers producing the item, price and availability of the item, quantity of orders, etc. This results in many scientific uncertainties since each forecasting algorithm may work well in some situations. As such, no single forecasting machine algorithm works best for all the data—the choice of the algorithm is data-dependent. Multiple forecasting machine algorithms may be tested on the data to see which work reasonably well.

Conventional approaches train forecasting machine algorithms offline and deploy a fixed forecasting model. However, such an approach may not fit well with the evolving nature of the historical lead time data or storage requirements needed when the machine learning algorithm is integrated with a supply chain planning platform in which data is constantly being updated. A transient-model methodology may be used where a model can be trained with "live" data and used to forecast lead times for a time period (e.g. three months, six months, twelve months, etc.) into the future, while forgetting about the model after runtime (i.e. retraining the model). Furthermore, as processing time must be reasonable (e.g. not more than 1-2 weeks), different forecasting machine algorithms can be evaluated for performance in terms of computational complexity/forecast quality for different datasets.

Since over-fitting is one of the critical challenges in machine learning, a trained model cannot generalize the historical data to predicted data. As such, the historical data can be divided into a set for training a forecasting machine learning algorithm, and a test set to validate the algorithm. Assuming that the future data follows a similar distribution as historical data, a model is validated on the test set to decide which algorithm and parameters to use for prediction of future data. This helps to reduce the risk of over-fitting to the historical data.

The forecasting machine learning algorithm may be first trained before it is used to forecast. As discussed above, due to the variability of the historical lead time data, a plurality of machine learning algorithms may be independently trained on a portion of the data. For example, if 2 years of data is provided, each forecasting machine learning algorithm may be trained on 70% of the data (i.e. approximately the first 17 months). Example of forecasting machine learning algorithms include Adaboost Regressor, FBProphet, linear regression, mean and median.

In some scenarios, the performance of an algorithm may be inadequate. As such, algorithm configuration parameters can be adapted to the data. For example, as sparse data adversely affects the "seasonality" feature of the FBProphet algorithm, a mechanism was developed to decide when this feature should be enabled. Furthermore, a number of experiments were attempted with different time-grouping strategies—which led to the conclusion that grouping the results after the forecast instead of before the forecast, may offer the best results. Despite running five models in parallel, at runtime, the computational complexity of the design met time completion requirements.

Once trained, each forecasting machine learning algorithm may be tested on the remaining 30% of the historical data. The lead times predicted by each forecasting machine learning algorithm are then compared to the historical lead times for the remaining 30% of the time period. The forecasting machine learning algorithm which proves to be the most accurate in predicting the remaining 30% of the data, is selected as the forecasting machine learning algorithm that will be used to forecast future lead times.

While the training and testing portions can be divided into 70%-30% portions, other portions are possible. For example the training portion may be 50%, while the testing portion may be the remaining 50%; or the training portion may be 60%, while the testing portion may be 40%; the training portion may be 75%, while the testing portion may be 25%. Any combination is possible, so long as the training portion is 50% or greater of the historical data, and the testing portion is 50% or less of the historical data.

As an example, for each of the five forecast machine algorithms that were being tested, it was hypothesized that most of the listed parameters (of each algorithm) should have a negligible effect on the quality of final forecasting. Experiments were performed to determine the importance of each parameter in the model quality. Finally, a few parameters were chosen for each of the algorithms and a grid search was performed on those parameters on the historical data.

In addition, experiments were designed to understand the effect of seasonality in the forecast quality. It was found out that modeling seasonality based on few observations and incomplete data may degrade the quality of forecasting. As such, precautionary steps were added to check whether a historical lead time data for a particular supply part is suitable for seasonality analysis.

The selected forecasting machine learning algorithm is first retrained on the full data set (i.e. the full 2 years), and then used to forecast lead times for a future time period. The future time period may be, for example, 0-24 months, or 3-15 months, or 12 months. For example, the future lead times can be provided for 3 months, 6 months, 9 months, 12 months, etc., from the date of running the forecasting machine algorithm.

Regarding the granularity of predictions, experiments were designed to compare the results of a monthly forecast with a daily forecast. While both monthly and daily forecasts provide useful information, predicting on a daily basis and aggregating all predictions of a month can provide better results than predicting any single point in a month (e.g. start, middle, or end).

In summary, a forecasting methodology was developed that can be successfully applied to any time series (of lead times) provided by a client, including sparse data sets. The methodology can use a plurality of machine learning algorithms (i.e. Adaboost Regressor, FBProphet, linear regression, mean, median) to assess performance on historical data and provide the best solution on future data. Further, certain algorithm parameters (e.g. seasonality) can be adapted dynamically to each dataset. The strength of the algorithm is that the assessment of the performance of each algorithm and their configuration is done at runtime which provides the flexibility to adapt to each dataset. Additionally, it was determined that grouping time-periods after forecasting can provide improved results.

Figure 7:
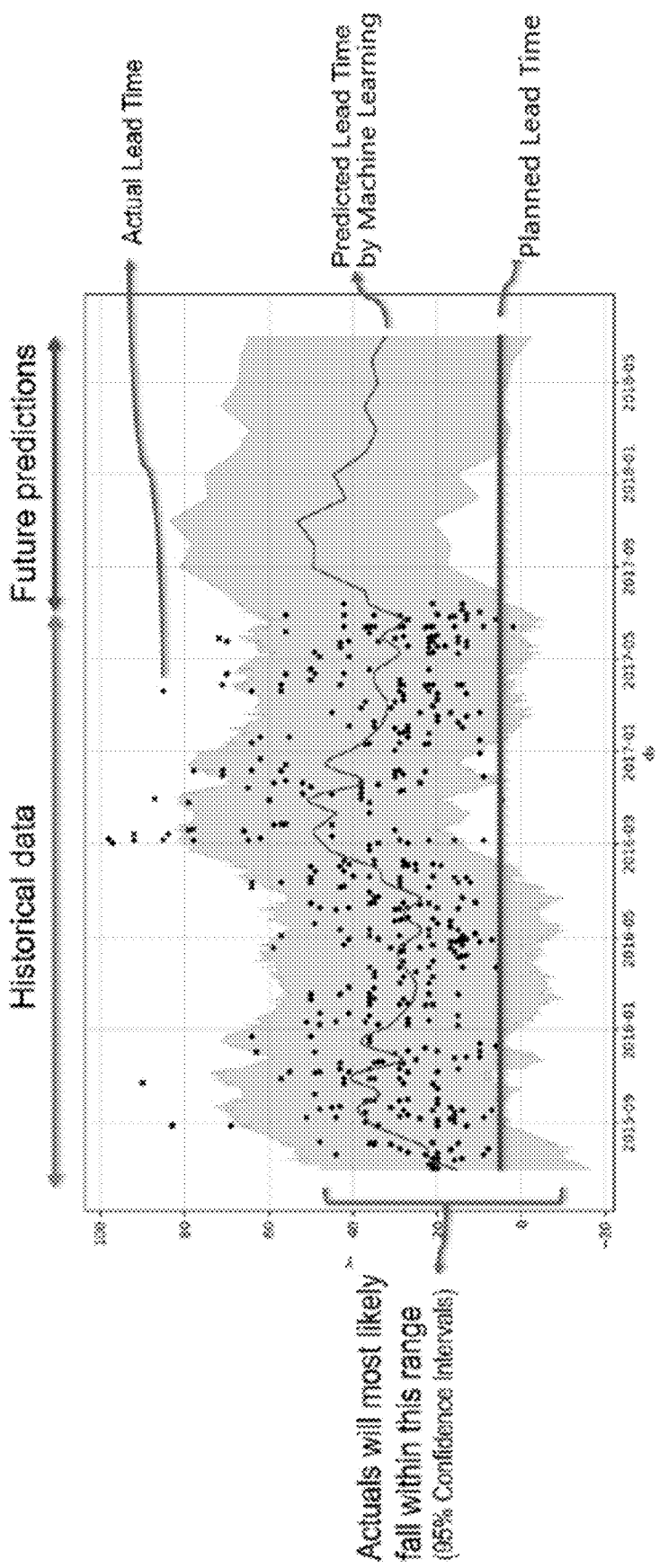
FIG. 7 illustrates 12-month forecasting using machine learning, based on the data shown in FIG. 1.

As an example, the historical lead time data shown in FIG. 1 was used to train a machine learning algorithm, which was then used to forecast future lead times. The resulting forecast of future lead times is shown in FIG. 7—for the 12 month period of July 2017 to July 2018. The predicted lead times vary from a low of about 35 days to a high of about 50 days—well above the planned lead time of 5 days. This information can be used to redesign the planned lead time to more accurately reflect the actual performance. Or it can be used to further investigate the source (or sources) of the average deviation from the planned deviation in the historical data set, and apply corrections to bring the actual lead times down closer to the planned lead times.

Use of Forecasting Results

The predicted lead times may be used to modify the design of the supply chain. Where the supply chain planning platform provides for rapid processing of hundreds of thousands of time series (i.e. the "Rapid response" platform defined above), a supply chain planner can set thresholds in the mean absolute deviation between planned and historical lead times for each time series, leading to "tolerance" zones for each time series. The planner can then use the machine learning forecasting results of lead times (that are uploaded onto the platform) in a rapid forecasting scenario of the "Rapid Response" platform to see if the scheduled lead times should be ignored or accepted.

For example, if a planner is tuning the lead times for a shipment of automobiles, s/he can define an "inside" tolerance threshold of 0-2 days (i.e. lead times in this zone do not have to be altered); a "near" tolerance threshold of 2-6 days (i.e. lead times in this zone may be automatically updated or may require further review by the planner); and a "outside" tolerance threshold of 6 days or more (i.e. lead times in this zone may have to be changed, but require review from a planner). The lead time zone thresholds and their actions can be changed depending on the product and can be set based on days or percentage. For example, the following tolerance thresholds can be set for another product such as a bicycle:

| Tolerance zone | Tolerance threshold | Definition |
| --- | --- | --- |
| Near tolerance | 5 | The mean absolute deviation is in between 5 and 9 days |
| Outside tolerance | 10 | The mean absolute deviation is 10 days or more |

Where the mean absolute deviation is less than 5 days, the tolerance zone is defined as "Inside tolerance". Where the mean absolute deviation is between 5-9 days, the tolerance zone is defined as "Near tolerance". Where the mean absolute deviation more than 10 days, the tolerance zone is defined as "Outside tolerance".

The following three examples (Tables 1-3) each illustrate a time series in which the planned lead time is compared to the actual lead time (for a number of time periods); the mean absolute deviation of each is calculated, and then categorized within one of the three tolerance zones.

TABLE 1

|  | Period 1 | Period 2 | Period 3 | Period 4 | Period 5 |
|---|---|---|---|---|---|
| Fixed lead time | 12 | 12 | 12 | 12 | 12 |
| Actual lead time | 8 | 8 | 8 | 8 | 8 |
| Difference | −4 | −4 | −4 | −4 | −4 |
| Absolute difference | 4 | 4 | 4 | 4 | 4 |

Here, the mean absolute deviation is (4 days×5)/5=4 days. Based on the tolerance threshold settings defined above, the absolute mean lead time deviation for this time series is categorized as "inside tolerance". As such, machine-learning forecasting results for this time series can be ignored, since the deviation is within an acceptable tolerance level.

TABLE 2

|  | Period 1 | Period 2 | Period 3 | Period 4 | Period 5 |
|---|---|---|---|---|---|
| Fixed lead time | 12 | 12 | 12 | 12 | 12 |
| Actual lead time | 6 | 6 | 20 | 18 | 18 |
| Difference | −6 | −6 | 8 | 6 | 6 |
| Absolute difference | 6 | 6 | 8 | 6 | 6 |

Here, the mean absolute deviation is (6+6+8+6+6) days/5=6.4 days. Based on the tolerance threshold settings defined above, the absolute mean lead time deviation for this time series is between 5 and 9 days and is thus categorized as "near tolerance". As such, machine-learning forecasting results for this time series may be used instead of the planned lead time. If, for example, the supply chain planning platform has automated that all of the deviations that are categorized as "near tolerance" should use forecasted lead times for future planning, then the forecasted results will be used for further analysis and predictions of future business metrics. If, on the other hand, the supply chain planning platform has indicated that "near tolerance" deviations should each be checked individually, then the planner will compare scenarios using planned lead times versus lead times forecast through machine learning, and decide how to proceed. As mentioned, these analyses are best performed on a rapid response platform.

TABLE 3

|  | Period 1 | Period 2 | Period 3 | Period 4 | Period 5 |
|---|---|---|---|---|---|
| Fixed lead time | 12 | 12 | 12 | 12 | 12 |
| Actual lead time | 1 | Null | 1 | 1 | 1 |
| Difference | −11 |  | −11 | −11 | −11 |
| Absolute difference | 11 |  | 11 | 11 | 11 |

Here, the mean absolute deviation is (11×4) days/4=11 days. Based on the tolerance threshold settings defined above, the absolute mean lead time deviation for this time series is above 10 days and is thus categorized as "outside tolerance". As such, machine-learning forecasting results for this time series may be used instead of the planned lead time. As for the "near tolerance" case, further action depends on what type of action has been set. If, for example, the supply chain planning platform has automated that all of the deviations that are categorized as "near tolerance" should use forecasted lead times for future planning, then the forecasted results will be used for further analysis and predictions of future business metrics. If, on the other hand, the supply chain planning platform has indicated that "near tolerance" deviations should each be checked individually, then the planner will compare scenarios using planned lead times versus lead times forecast through machine learning, and decide how to proceed. As mentioned, these analyses are best performed on a rapid response platform.

Clustering

Clustering (via machine learning) may be used to identify problems in a supply chain. One technique that may be used is the classification of lead-time clusters based on their shape and pattern with respect to lead time. For example, lead-times within a given cluster can help to identify a problem source (e.g. a particular supplier). However, due to the large size of datasets used in supply chain management, the Dynamic Time Warp (DTW) algorithm that is commonly used for clustering, may not be used due its quadratic time-complexity which makes it computationally prohibitive to use. Alternate conventional clustering algorithms (e.g. density-based, hierarchical, iterative, etc) may not be able to handle the large data set, and lead to poor clustering performance. The key is to find a robust, high-performance clustering technique that is able to handle large data sets (from supply chain data). For example, a data set can include hundreds of thousands to a few hundred million data points.

It was hypothesized that performance may be improved by augmenting the raw data with features (e.g. higher order statistics and available metadata). After iterative experimentation with different features and algorithms, two features were identified that significantly improved the performance of the clustering algorithms: linearity (obtained through linear regressions) and seasonality (obtained through Fourier transform). The quality of a cluster was quantified by employing internal validation measures which were computed based on similarities of data points within a cluster and their dissimilarities to data points in other clusters.

However, validation showed that in some scenarios, clustering full feature space (e.g. where data and each feature are orthogonal dimensions) did not perform as expected as the data points were too noisy or equidistant from each other, making it difficult to have reliable clustering. It was found that by projecting the higher dimensionality dataset to 2-dimensional space, noise was reduced, and clustering performance was improved in some scenarios and the approach was adopted.

As such, a computationally efficient clustering technique was developed that enabled identification of potential issues with a client's supply lines. Given the large amounts of data, it was found that conventional clustering algorithms could not be used in a standard manner. A clustering strategy was developed that uses derived statistics such as trends and seasonality to improve the performance of the clustering algorithms. Additionally, a technique was developed to reduce the noise of results by projecting onto two-dimensional space.

Figure 8:
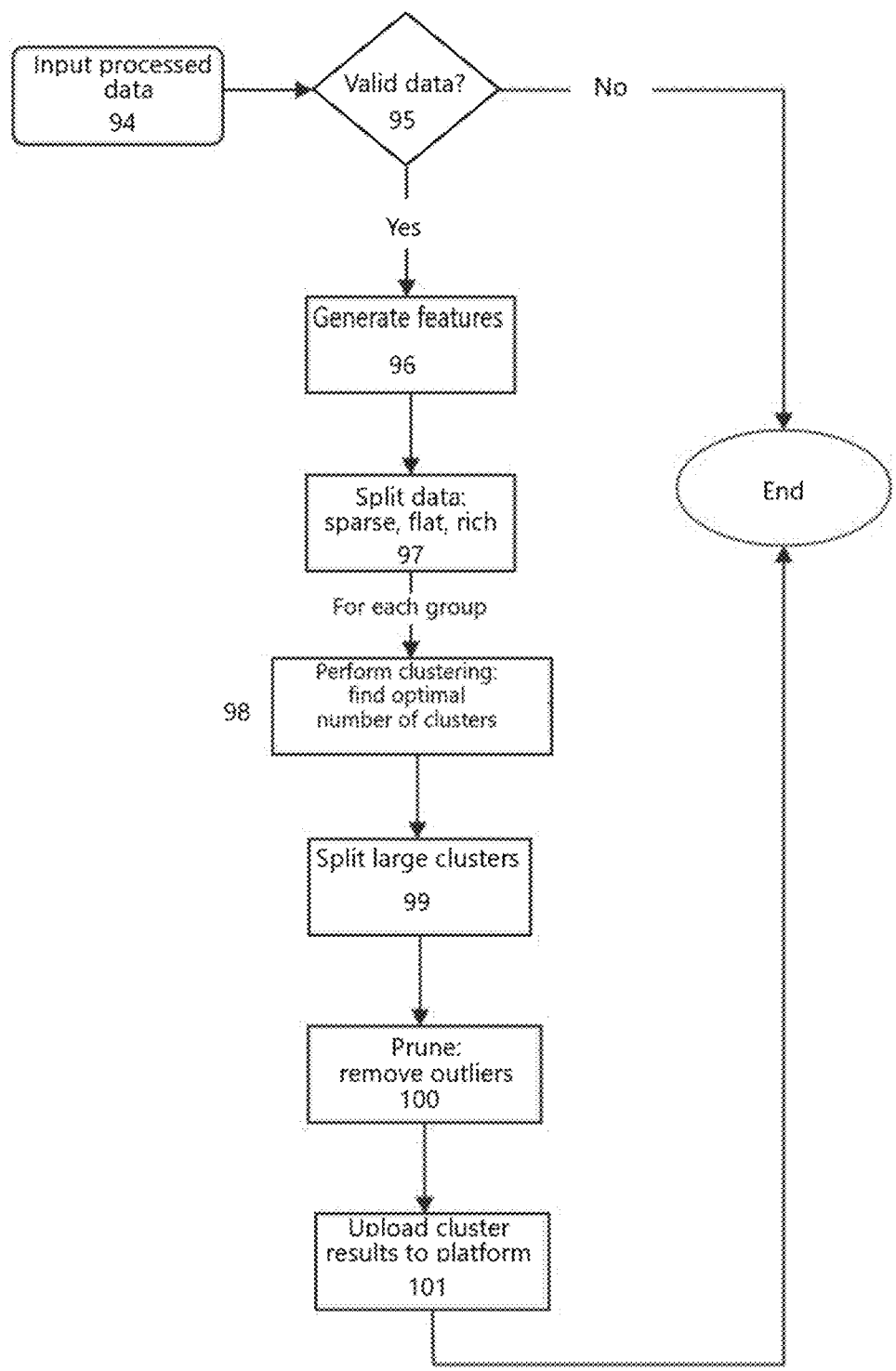
FIG. 8 illustrates a flow chart of the Clustering component of FIG. 3.

FIG. 8 provides a flowchart for an embodiment for cluster analysis. The clustering algorithm retrieves data (94) that has been processed and checks to make sure that the processed dataset is valid (95) for clustering analysis (i.e. it is not empty). Features are then generated (96) for each time series in the dataset.

Figure 9A:
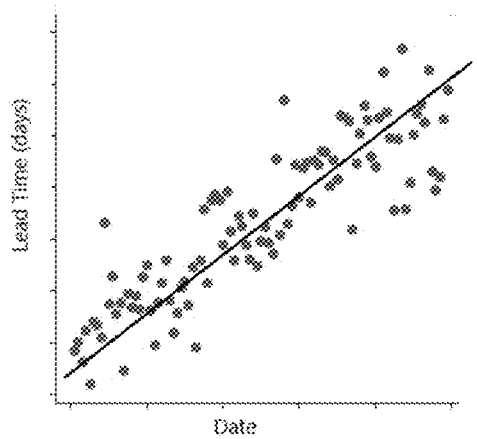
FIGS. 9A-9E provide examples of four features for the clustering analysis.
Figure 9B:
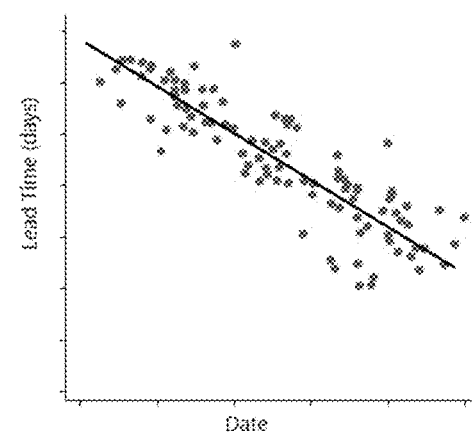
Figure 9C:
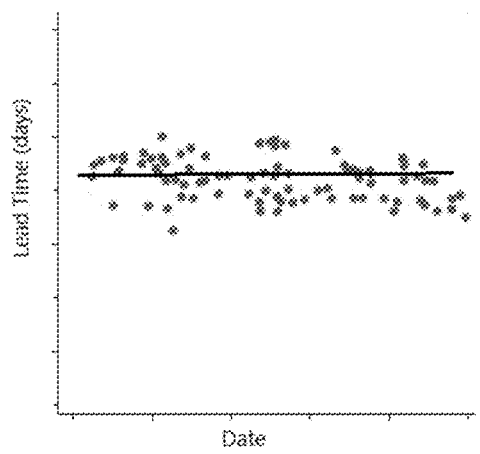
Figure 9D:
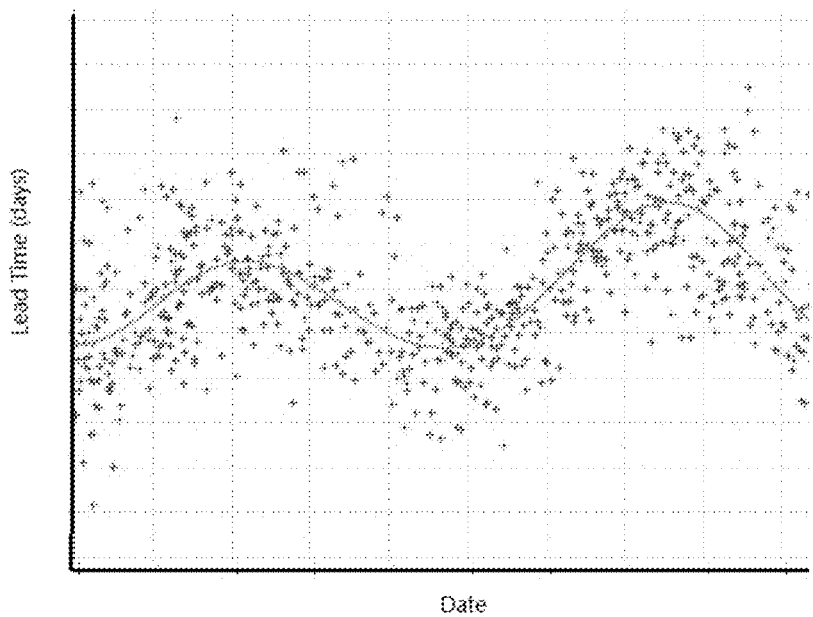
Figure 9E:
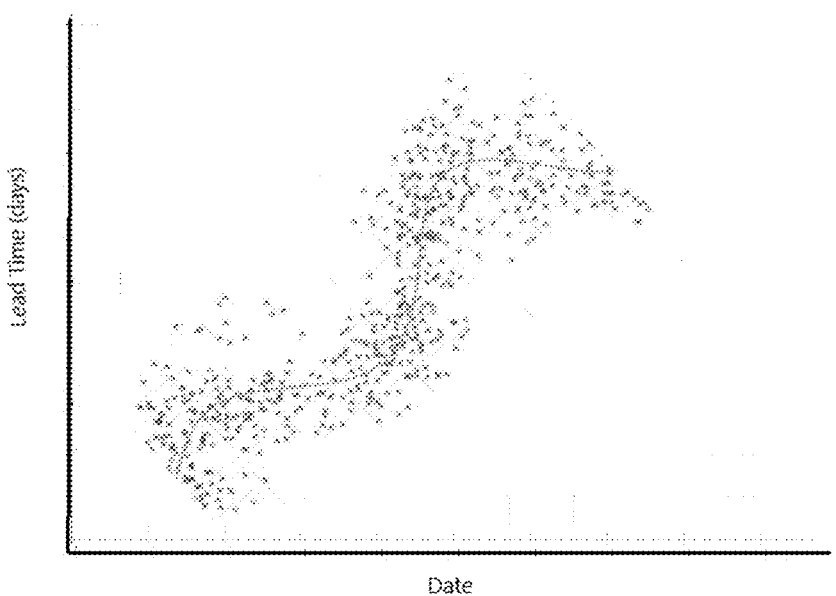

For example, the following four features can be identified: seasonality; upward linearity; flat linearity and downward linearity. Examples of each of the possible four features are shown in FIGS. 9A-9D. In FIGS. 9A-9C, each scatter plot can be approximated by a line of best fit y=mx +b, where 'm' is the slope and 'b' is the y-intercept. In FIG. 9A, m>0 (upward trend); in FIG. 9B, m<0 (downward trend) and in FIG. 9C, m is approximately 0 (flat trend). In FIG. 9D, the scatter plot demonstrates seasonality. FIG. 9E illustrates a scatter plot that has both seasonality and an upward trend (m>0). While four features have been identified, it is possible for more or fewer features may be identified for a clustering analysis.

The data may be then split (97) into three groups, prior to the cluster analysis: whether the data in each time series is sparse, flat or rich. For example, if each time series reflects the lead time of a particular item from a particular origin to a particular destination over a period of two years, the time series can have 24 data points (i.e. one data point per month). A time series categorized as "sparse" may have less than a threshold of data points (for example, 12), whereas a "rich" dataset can have greater than a threshold of data points. A time series categorized as "flat" has the same lead time over the 24-month period.

Clustering may be performed on each of the three groups (i.e. "sparse", "flat" and "rich") by finding an optimum number of clusters (98). The optimum number may be between 2 and 100 clusters. Once the number of clusters is established (for each group), an initial clustering is performed. Within each group, there is an optional step of splitting large clusters (99) further into smaller sub-clusters. Finally, each of the clusters (within each group) may be pruned (100) by removing outlier data, which can be identified, for example, by using a quartile analysis. The final cluster results for each of the three groups can then be uploaded (101) to a supply chain planning platform for further analysis.

Use of Clustering Results

The machine learning clustering analysis may be used to identify problem points in the supply chain. Where a supply chain planning platform provides for rapid processing of hundreds of thousands of time series—i.e. a rapid response platform (as defined above), a supply chain planner can set thresholds in the mean absolute deviation between planned and historical lead times for each time series, leading to "tolerance" zones for each time series, in a manner similar to that described above.

The cluster results, which are uploaded to the supply chain planning platform, can then be filtered first by tolerance zones, and then within each tolerance zone, filtered by specific supply chain identifiers, such as part site, supplier identification, the destination site of the part, the region of the supplier site, the transportation mode for the part, trend (whether the lead times are trending upward, downward or flat); and seasonality (whether the lead times are seasonal or not).

Figure 10:
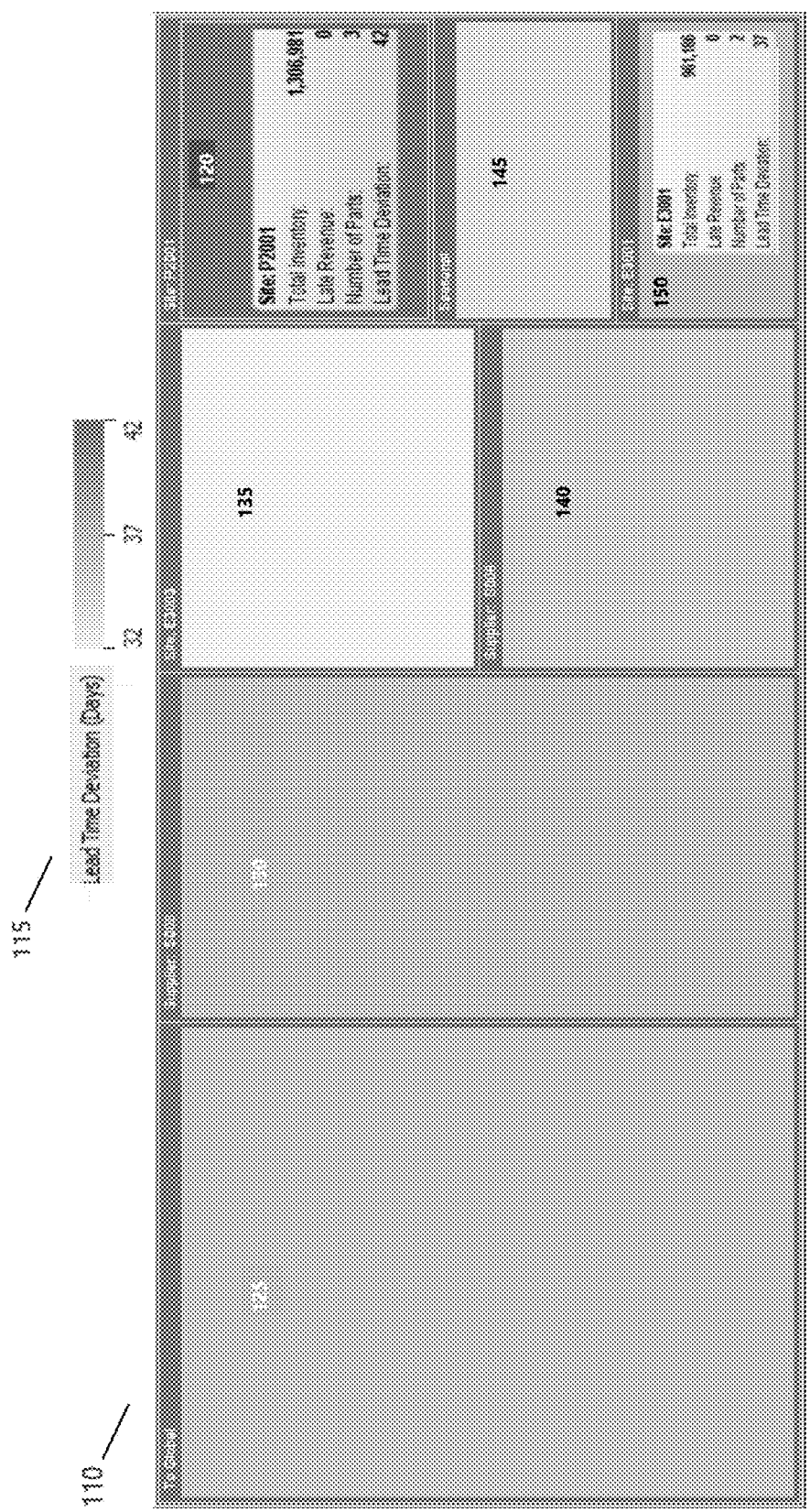
FIG. 10 illustrates a tree map following processing of cluster results.

FIG. 10 illustrates a tree map (110) which depicts clusters of parts that are outside a tolerance zone, which in this example, is defined as 32 days according to the lead times deviation scale (115). All of parts (in each sub-cluster) are late, since the actual lead times have an absolute mean deviation greater than 32 days.

The size of each box represents the number of parts in the cluster. The heading of each box refers to a cluster category. The shading of each box represents the lead time deviation (the darker the shading, the greater, the deviation). For example, the largest box (125) seems to have a lead time deviation of about 37 days (the header "Global" is an identification of a manufacturing site). The next largest box (130), about two-thirds the size of box (125), seems to have a lead time deviation of about 37 days, and refers to a certain supplier, identified as "S008". That is, a sizeable number of parts from supplier S008 has a lead time deviation of about 37 days, which provides a planner useful information about possible issues with supplier S008.

Cluster (135), about half the size of cluster (130), has a shorter lead time deviation of about 32 days (as ascertained by the light shading). This refers to a particular site in the supply chain of all parts, identified as site "E3003". An equal number of parts (to those in cluster (135)), as identified by box (140), however, has a higher lead time deviation of about 36 days. This cluster refers to supplier S006 in the supply chain for all parts.

Next, in the right-hand most column, there are three groups of clusters (120, 145, 150), with a relatively small number of parts (as evidenced by the size of each respective box).

There is a cluster of parts (120) that is represented by the darkest shade, indicating the largest lead time deviation of 42 days. By its size, this cluster represents a relatively small number of parts (the number of parts in this cluster is 3, as shown in the statistics box). The darker shade means that this cluster is not only seriously outside of tolerance, but also places a potentially disproportionate amount of revenue at risk. This dark cluster (120) may be a good place to focus further analysis on a problem point in the supply chain. Its heading points to a particular site, identified as "P2001", which provides a planner instant insight into where the most acute problem in the supply chain may lie (i.e. at site P2001).

The remaining clusters (145) and (150) are slightly smaller than cluster (120), and depict 2 parts each as being outside tolerance. Cluster (145) refers to a seasonal cluster, where the lead time deviation is about 34 days, while cluster (150) has a lead time deviation of about 37 days for 2 parts, and refers to a site identified as Site "E3001".

Further analytics can be provided based on a cluster tree analysis. This is shown if FIG. 11, which illustrates business impact and revenue at risk results using analytical tools in a supply chain planning platform that provides prompt analysis (e.g. a rapid response platform, as defined above).

Figure 11:
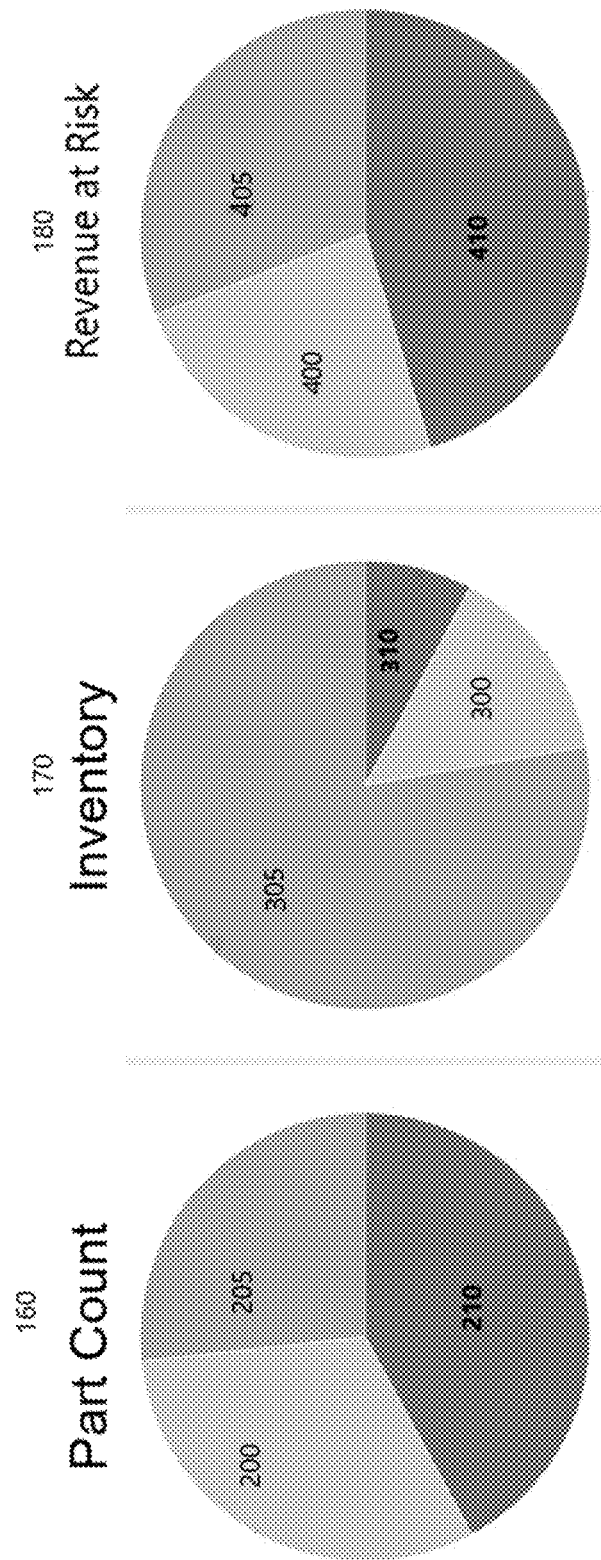
FIG. 11 illustrates business impact and revenue at risk results using analytical tools in a supply chain planning platform.

In FIG. 11, the pie chart labeled Part Count (160) is divided into three segments: inside tolerance (205); near tolerance (200) and outside tolerance (210). Roughly 30% of the items had a demonstrated lead time close to the designed lead time, meaning that the absolute mean value lead time was inside tolerance (205) (i.e. within an acceptable range). About another 30% of items had higher lead time deviations, but where still in a near tolerance zone (200). Finally, around 40% of the items were outside tolerance (210).

The Part Count pie chart (160) doesn't necessarily imply that any action should be taken. However, ramifications of these results may be evaluated by looking at the possible interplay between an Inventory pie chart (170) and a Revenue at Risk pie chart (180). Such results may be provided through analytical tools of a supply chain planning platform, such as a rapid response platform as defined above.

According to chart (170), about 80% of inventory is associated with items that are inside tolerance (305), while 10% is associated with items near tolerance (300). However, only 5% of inventory is associated with items whose demonstrated lead time is outside tolerance (310). According to this analysis, while roughly 40% of items are outside tolerance (based on Part Count chart (160), this leads to only about 5% of inventory having a lead time outside tolerance. However, the inventory quantity in of itself does not provide full information.

A revenue at risk chart (180) shows that approximately 45% of overall revenue is at risk—as shown by portion (410). That is, a relatively small number of parts that are in the outside tolerance zone (310) in inventory chart (170) can have a disproportionate impact on revenue. Such an analysis shows that remediating lead time problems with a relatively small number of parts can have an enormous return.

Figure 12:
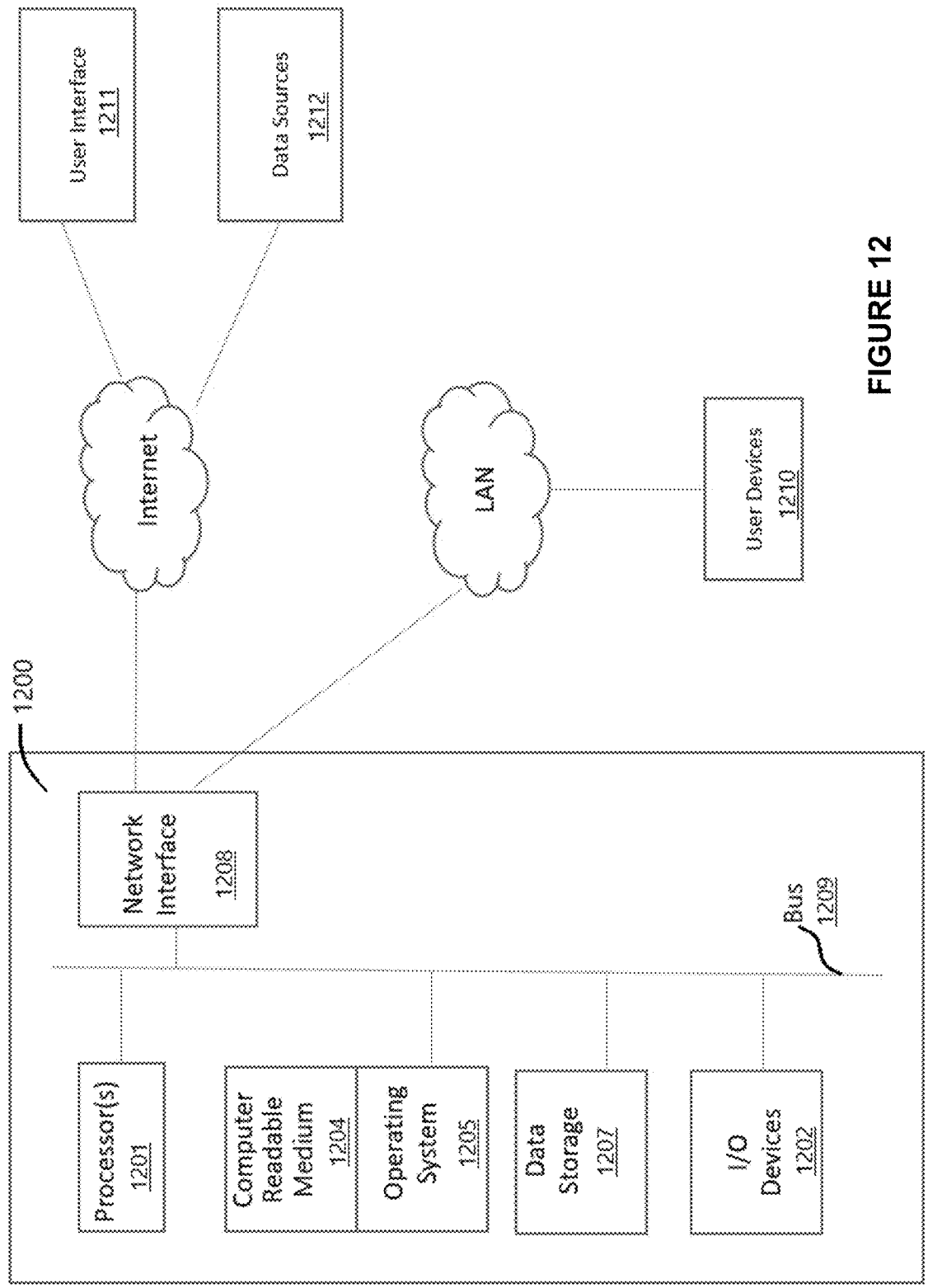
FIG. 12 illustrates a computer system 1200 that may be used to implement the system shown in either FIG. 2A or 2B.

FIG. 12 illustrates a computer system 1200 that may be used to implement the system shown in either FIG. 2A or 2B. It is understood that the illustration of the computer system 1200 is a generalized illustration and that the computer system 1200 may include additional components and that some of the components described may be removed and/or modified. Also, the system shown in either FIG. 2A or 2B may be implemented in a distributed computing system, such as a cloud computer system. For example, the computer system 1200 may represent a server that runs the system shown in either FIG. 2A or 2B or the computer system 1200 may comprise one of multiple distributed servers that performs functions of the system shown in either FIG. 2A or 2B.

The computer system 1200 includes processor(s) 1201, such as a central processing unit, application specific integrated circuit (ASIC) or other type of processing circuit; input/output devices 1202, such as a display, mouse keyboard, etc.; a network interface 1208, such as one or more interfaces for connecting to a Local Area Network (LAN), a wireless 802.11x LAN, a 7G or 4G mobile WAN or a WiMax WAN, or other type of network; and a computer readable medium 1204. Each of these components may be operatively coupled to a bus 1209. The computer readable medium 1204 may be any suitable medium which participates in providing instructions to the processor(s) 1201 for execution. For example, the computer readable medium 1204 may be non-transitory or non-volatile media, such as a magnetic disk or solid-state non-volatile memory or volatile media such as RAM. The instructions stored on the computer readable medium 1204 may include machine readable instructions executed by the processor(s) 1201 to perform the methods and functions of the system shown in either FIG. 2A or 2B.

The computer readable medium 1204 may store an operating system 1205, such as MAC OS, MS WINDOWS, UNIX, or LINUX, and one or more applications, which can include the modules for the system shown in either FIG. 2A or 2B. The operating system 1205 may be multiuser, multiprocessing, multitasking, multithreading, real-time, etc.

The computer system 1200 may include a data storage 1207, which may include non-volatile data storage. The data storage 1207 stores data used by the system shown in either FIG. 2A or 2B (i.e. stores data used by the machine learning services). The data storage 1207 may be used for a data repository (not shown) or the computer system 1200 may be connected to a database server (not shown) for providing the data repository.

End user devices 1210 and other computer systems/servers may also connect to the computer system 1200 via the LAN and network interface 1208. Also, the network interface 1208 may connect the computer system 1200 to the Internet. For example, the computer system 1200 may connect to user interface 1211 and data sources 1212 via the network interface 1208 and the Internet.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A computer-implemented method comprising:
receiving, by a data preparation module, historical lead time data from a database;
augmenting, by the data preparation module, the historical lead time data with one or more features;
separating, by the data preparation module, the historical lead time data into one or more groups based on a time density of data points comprising the historical lead time data;
selecting, by a machine learning clustering module, an optimal number of clusters for each of the one or more groups;
performing, by the machine learning clustering module, clustering on each of the one or more groups to provide a plurality of clusters;
receiving, by an analytics module, from a user via a user interface, tolerance criteria for separation of the historical lead time data into a plurality of tolerance zones;
separating, by the analytics module, the historical lead time data into the plurality of tolerance zones;
separating, by the analytics module, the plurality of clusters in accordance with a tolerance zone of each group;
further separating, by the analytics module, the plurality of clusters according to one or more lead time identifiers, to provide one or more separated clusters; and
identifying, by the analytics module, within the one or more separated clusters, one or more clusters that have a largest median absolute differences between actual lead times and planned lead times;
wherein:

the plurality of tolerance zones is based on median absolute differences between actual lead time data and historical planned lead time data.

2. The computer-implemented method of claim 1, wherein the one or more features relate to linearity and seasonality.

3. The computer-implemented method of claim 2, wherein the features are seasonality, upward linearity, flat linearity, and downward linearity.

4. The computer-implemented method of claim 2, wherein clustering comprises projection of a higher dimensionality dataset onto a two-dimensional space.

5. The computer-implemented method of claim 1, wherein the number of groups is three.

6. The computer-implemented method of claim 1, further comprising:
pruning, by the machine learning clustering module, each cluster;
dividing, by the machine learning clustering module, each cluster into a plurality of subclusters.

7. A system comprising:
a processor; and
a memory storing instructions that, when executed by the processor, configure the system to:
receive, by a data preparation module, historical lead time data from a database;
augment, by the data preparation module, the historical lead time data with one or more features;
separate, by the data preparation module, the historical lead time data into one or more groups based on a time density of data points of the historical lead time data;
select, by a machine learning clustering module, an optimal number of clusters for each of the one or more groups;
perform, by the machine learning clustering module, clustering on each of the one or more groups to provide a plurality of clusters;
receive, by an analytics module, from a user via a user interface, tolerance criteria for separation of the historical lead time data into a plurality of tolerance zones;
separate, by the analytics module, the historical lead time data into the plurality of tolerance zones;
separate, by the analytics module, the plurality of clusters in accordance with a tolerance zone of each group;
further separate, by the analytics module, the plurality of clusters according to one or more lead time identifiers to provide one or more separated cluster; and
identify, by the analytics module, within the or more separated clusters, one or more clusters that have a largest median absolute differences between actual lead times and planned lead times; wherein:
the plurality of tolerance zones is based on median absolute differences between actual lead time data and historical planned lead time data.

8. The system of claim 7, wherein the one or more features relate to linearity and seasonality.

9. The system of claim 8, wherein the features are seasonality, upward linearity, flat linearity, and downward linearity.

10. The system of claim 8, wherein clustering comprises projection of a higher dimensionality dataset onto a two-dimensional space.

11. The system of claim 7, wherein the number of groups is three.

12. The system of claim 7, wherein the instructions further configure the system to:
prune, by the machine learning clustering module, each cluster;
divide, by the machine learning clustering module, each cluster into a plurality of subclusters.

* * * * *

UNITED STATES PATENT AND TRADEMARK OFFICE
CERTIFICATE OF CORRECTION

PATENT NO. : 11,188,856 B2
APPLICATION NO. : 17/060225
DATED : November 30, 2021
INVENTOR(S) : Oliveira Almeida et al.

Page 1 of 1

It is certified that error appears in the above-identified patent and that said Letters Patent is hereby corrected as shown below:

In the Specification

Column 4, Line 51:
Delete the phrase "...for each tolerance zone" and insert -- for each tolerance zone. --

Signed and Sealed this
Tenth Day of May, 2022

Katherine Kelly Vidal
*Director of the United States Patent and Trademark Office*